United States Patent [19]

Tabor

[11] 4,069,811

[45] Jan. 24, 1978

[54] SOLAR COLLECTORS

[76] Inventor: Harry Zvi Tabor, 13 Hameyasdim Street, Jerusalem, Israel

[21] Appl. No.: 674,949

[22] Filed: Apr. 8, 1976

[30] Foreign Application Priority Data

Apr. 24, 1975 Israel ............................................ 47166

[51] Int. Cl.² ................................................. F24J 3/02
[52] U.S. Cl. ........................................ 126/271; 165/82; 165/171; 237/1 A
[58] Field of Search ............... 126/270, 271; 237/1 A; 165/82, 171

[56] References Cited

U.S. PATENT DOCUMENTS

| 3,923,039 | 12/1975 | Falbel | 126/271 |
| 3,974,824 | 8/1976 | Smith | 126/271 |
| 3,990,430 | 11/1976 | Robertson | 126/271 |
| 4,002,160 | 1/1977 | Mather, Jr. | 126/271 |

FOREIGN PATENT DOCUMENTS

| 938,012 | 9/1963 | United Kingdom | 126/271 |
| 806,707 | 12/1958 | United Kingdom | 165/171 |
| 1,304,685 | 1/1973 | United Kingdom | 165/171 |

Primary Examiner—Kenneth W. Sprague
Assistant Examiner—James C. Yeung
Attorney, Agent, or Firm—Benjamin J. Barish

[57] ABSTRACT

A solar collector including an absorber having at least one channel for conducting a fluid receiving the heat absorbed, a housing enclosing the absorber and having radiation-transparent windows covering and spaced from both faces of the absorber, and partition members disposed between the absorber and the housing and effective to block the circulation of air flowing in the space between one face of the absorber and the housing from flowing to the space between the other face of the absorber and the housing, to thereby reduce convection losses from the absorber.

8 Claims, 10 Drawing Figures

SOLAR COLLECTORS

BACKGROUND OF THE INVENTION

The present invention relates to solar collectors. It is particularly useful with respect to flat-plate solar collectors, and is therefore described below in this type of application.

The flat-plate solar collector comprises a metal plate absorber suitably blackened to absorb solar radiation. Within the plate, or attached to it, are tubes or channels that carry the fluid to be heated. This fluid is usually water, but other fluids may be used. The absorber is covered on the side facing the sun by a radiation-transparent window, e.g. of glass or transparent plastic, which reduces cooling by the wind and provides a layer of air acting as insulation between the absorber and the cover window. Multiple glazing is sometimes used to reduce heat losses still further. The rear side of the absorber is normally covered by insulation material of low thermal conductivity to reduce heat losses from that side. A box encloses the absorber and insulation to protect them from the elements and to allow the unit to be transported to the side of use.

It has been proposed to omit the rear insulation material, to replace it by a transparent window, and to provide reflecting surfaces to direct solar and/or sky radiation to the rear side, while the other side is irradiated by direct insolation. In this way more energy is collected from a single absorber. Such a system may be called to double-sided collector.

SUMMARY OF THE INVENTION

The present invention is directed particularly to an improved form of double-sided collector having a number of advantages as will be described more fully below.

According to the present invention, there is provided a solar collector including an absorber having at least one channel for conducting a fluid receiving the heat absorbed, a housing enclosing the absorber and having radiation-transparent windows covering and spaced from both faces of the absorber, and partition members disposed between the absorber and the housing. The absorber is of smaller width and length than the housing; and the partition members thermally insulate the absorber from the housing and bridge the spaces between the housing and the absorber along its length and width to block the circulation of air flowing in the space between one face of the absorber and the housing from flowing to the space between the other face of the absorber and the housing, to thereby reduce convection losses from the absorber.

According to another feature, the absorber is a flat plate of smaller width and length than the housing, and the partition members are of low thermal conductivity and bridge the spaces between the housing and the absorber along its length and width.

According to a further feature, the partition members are attached to the housing and support the absorber within the housing.

According to one described embodiment, the housing is made of two half-sections attachable together so that one section covers one face of the absorber and the other section covers the other face of the absorber, the partition members being clamped between the two housing sections when attached together.

According to another described embodiment, the housing is a thin transparent plastic envelope enclosing the absorber, the absorber being of sufficiently rigid material to provide substantially the complete rigidity of the overall collector.

According to a further described feature, the absorber includes upper and lower metal plates each formed with at least one groove extending the length thereof, the plates being fixed to each other with a fluid tube disposed within the groove to provide said fluid channel.

According to a still further feature, each plate also includes at least one further groove extending longitudinally thereof, said further groove being vacant of a fluid tube and serving to rigidize the absorber.

The foregoing features enable the construction of inexpensive and efficient solar collectors. Further features and advantages of the invention will be apparent from the description below.

BRIEF DESCRIPTION OF THE DRAWINGS

The invention is herein described, somewhat diagramatically and by way of example only, with reference to several preferred embodiments illustrated in the accompanying drawings, wherein.

DESCRIPTION OF THE PREFERRED EMBODIMENTS

Figure 1:
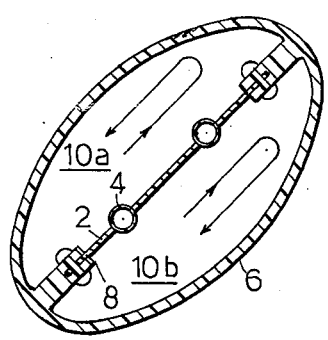
FIG. 1 is a longitudinal sectional view illustrating one form of solar collector constructed in accordance with the invention.

Turning first to FIG. 1, there is shown a generalized form of solar collector constructed in accordance with the invention, including a flat plate absorber 2 formed with one or more channels 4 for conducting a fluid (such as water) receiving the heat absorbed by the absorber, and a housing 6 provided with radiation-transparent windows covering but spaced from both faces of the absorber. The absorber plate 2 is of smaller dimensions than the housing, both in width and length, so that it is spaced on all four of its sides from the inner surfaces of the housing. The collector further includes partition members 8 of low thermal conductivity bridging the space between the four sides of the absorber and the housing.

Housing 6 is preferably made of transparent plastic to form a transparent window-box for the absorber. The absorber plate 2 lies approximately in the mid-plane of the window-box 6 and does not touch its sides in order to reduce heat losses from the edges of the absorber plate. The low thermal-conductivity partition walls 8 bridge the gaps between the absorber plate 2 and the side walls of the window box housing 6 in order to reduce the convection losses from the absorber. If partitions 8 were to be omitted, air would tend to circulate around the entire absorber plate, producing substantial convection losses; but by the provision of the partitions 8, the convection losses are substantially reduced since the air flow in space 10a at one face of the absorber plate is blocked from circulating to space 10b at the other face of the absorber plate.

It will thus be seen that a solar collector constructed in accordance with FIG. 1 enables more energy to be collected from a single absorber since both faces of the absorber plate are used for absorbing the solar radiation. At the same time, conduction losses are reduced since the edges of the absorber are insulated from the housing, and convection losses are also reduced since the air currents from one side are blocked from flowing to the other side. In addition a simple and inexpensive construction is provided since the absorber housing may be in the form of a low-cost transparent window box.

The absorber plate 2 is preferably given a selective black coating on both faces in accordance with known techniques. Preferably the selective black coating should be one producing a strong solar-radiation-absorbing surface having a thermal emittance of 0.1 or less. Techniques for producing such selective black coatings are known, as described for example in Israel Pat. No. 8678.

Preferably, the collector should be narrow and long to reduce the number of plumbing joints. As one example, the absorber may be about 30 cm. wide or less. In such cases, only one or two fluid channels 4 are needed. The narrow width also allows the plastic window-box to be made of thin material, thereby reducing the cost of materials.

Figures 2, 3:
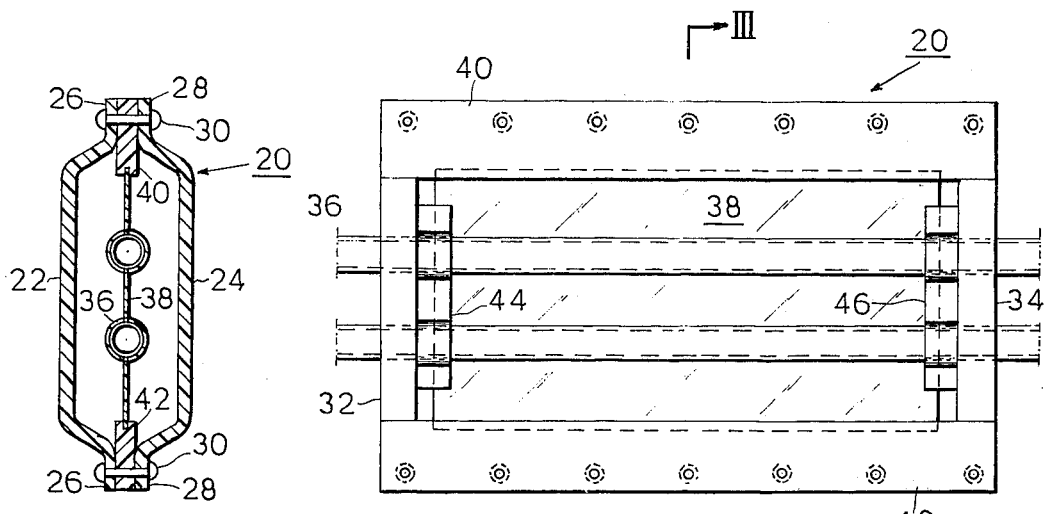
FIG. 2 is a plan sectional view of another form of solar collector constructed in accordance with the invention.
FIG. 3 is a transverse section along lines III — III of FIG. 2.
Figure 4:
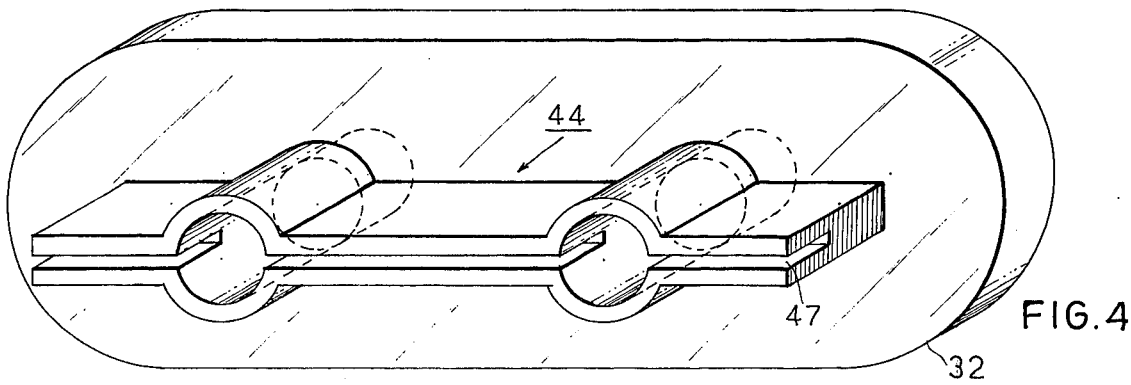
FIG. 4 is an enlarged perspective view of one of the partition walls in the solar collector of FIGS. 2 and 3.

FIGS. 2–4 illustrate a more specific construction of a solar collector in accordance with the invention.

The window-box housing, generally designated 20, of the solar collector is made of two transparent plastic sections 22, 24 each formed with outer longitudinally extending flanges 26, 28 which receive fasteners 30, such as bolts, rivets or clips, for attaching the two sections together. The two sections 22, 24 may be extruded or vacuum-formed from plastic sheets, such as polymethyl methacrylate, allyl diglycol carbonate, glassfibre reinforced resin, etc., and may be produced as continuous channels which are cut transversely according to the lengths required.

The solar collector of FIGS. 2–4 may be assembled in the following manner:

After two plastic channel sections 22, 24 have been cut according to the desired length, the ends are closed by end walls 32, 34 which end walls are also used to support the fluid tubes 36 of the absorber plate 38. The absorber plate 38 is of narrower width and length than the housing 20, and the space between the edges of the absorber plate and the inner walls of the housing are bridged by a pair of longitudinal partition walls 40, 42 and a further pair of transverse partition walls 44, 46. The transverse walls 44, 46 are formed with openings for the tubes 36 and include slots 47 (see FIG. 4) in which the absorber plate 38 enters and which allow for differential expansion between the absorber and the housing. These walls 44, 46 are clamped to — or may be moulded as an integral part of — the end walls 32, 34. The longitudinal partition walls 40, 42 are clamped between the flanges 26, 28 of the two housing sections 22, 24 and (as shown in FIG. 4) may be slotted along the length to receive the absorber plate 38.

A very simple, inexpensive and efficient solar collector is thus provided which the conduction and convection losses are reduced by the partition walls 40, 42, 44, 46, which insulate the absorber plate from the housing and also block the circulation of the air over the two faces of the absorber plate. The partition walls are made of low thermal-conductivity material, such as fibreboard or high-temperature plastic.

Figure 5:
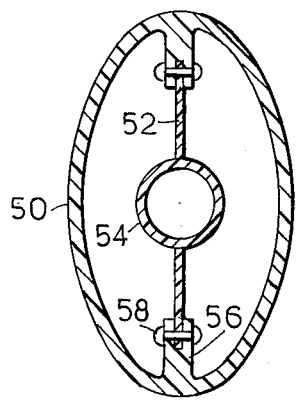
FIG. 5 illustrates a still further form of solar collector constructed in accordance with the invention.

FIG. 5 shows another form of collector construction. In this case, the housing 50 is made of a one-piece transparent plastic completely enclosing the absorber plate 52. This plate, which includes at least one fluid conduit 54, is supported within the transparent housing 50 by means of the partition walls 56, the latter being attached to the ends of the absorber plate 52 by fasteners 58, such as clips or rivets. The transparent housing 50 may be made of thin plastic material, the flat plate absorber 52 being sufficiently rigid to provide substantially the complete rigidity of the overall collector.

FIGS. 6–9 illustrate various techniques that may be used for making the absorber.

Figure 6:
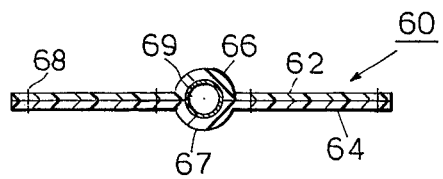
FIGS. 6–9 illustrate in transverse section several different flat plate absorber constructions that may be used in the collector of the invention.

In FIG. 6, the absorber, generally designated 60, is made of two flat plates 62, 64, each formed with one or more longitudinal-extending grooves 66, 67. The two plates are attached together, for example by the use of fasteners or spot welds 68, with the two grooves 66, 67 receiving a thin-walled plastic or copper 52 for the fluid to be heated by the absorbed solar heat.

Figure 7:
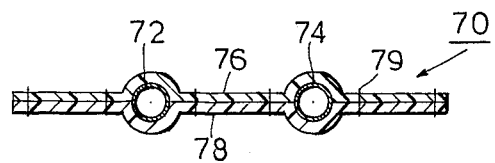

FIG. 7 illustrates a similar construction, generally designated 70, except that instead of providing a single tube (69) for the fluid to be heated, two tubes 72, 74 are provided, these being received in two semi-circular recesses formed in the two plates 76, 78 fastened together by spot-welds 79, for example.

Figure 8:
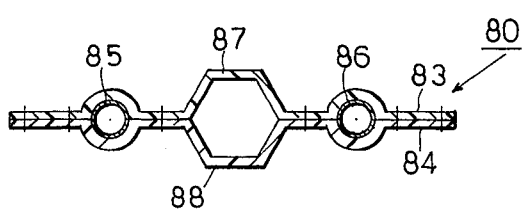

FIG. 8 illustrates another construction of absorber plate. Here, the absorber plate 80 is also made of two plates 83, 84, defining two channels for receiving two fluid tubes 85, 86, except that in order to rigidize the absorber, the two plates 83, 84 are each formed with an additional longitudinally-extending recess 87, 88, defining a channel 89 which is vacant of a fluid tube. The FIG. 8 construction has the advantage of providing a rigid absorber while keeping the liquid volume down to a minimum, to minimize thermal inertia.

Figure 9:
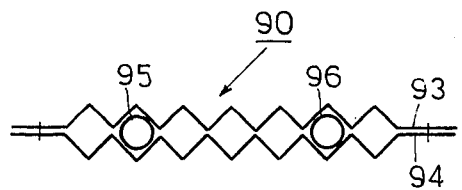

FIG. 9 illustrates yet another construction that may be used for the absorber plate. In this case, the absorber 90 is made of two corrugated plates 93, 94, but only two of the corrugations in each plate are used for accommodating the fluid tubes 95, 96, the remaining corrugations being used for rigidizing purposes and for increasing the absorbency of solar radiation.

Figure 10:
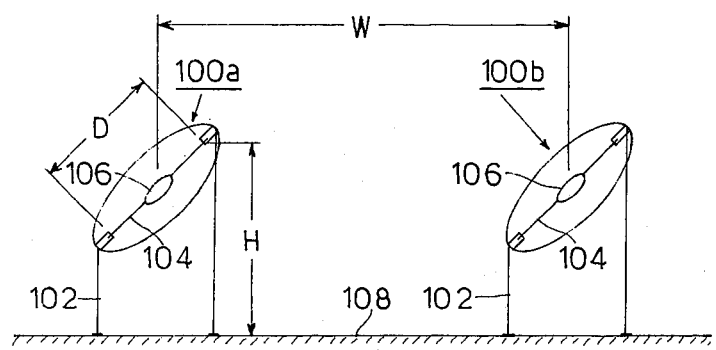
FIG. 10 illustrates the use of an albedo board with the solar collector of the invention.

The double-sided collector described above is preferably used in an arrangement wherein its rear side is irradiated by albedo, that is, by the solar and sky radiations reflected from the ground or other reflecting surface. This is shown in FIG. 10, wherein it is seen that the collectors (two of which are shown and generally designated 100a, 100b) are mounted some distance from the ground (or roof) on which they are fixed, for example by supports 102. The collectors may be constructed as in any of the above-described embodiments, FIG. 10 illustrating the collectors as having absorber plates 104 with a single fluid tube 106. The narrow dimension of each absorber plate is indicated as D, and each collector is supported at an incline at the height H which is at least equal to D, and preferably 2D or more. The ground or roof 108 on which the collectors are supported is painted white, or is covered with light color sand or cement, in order to irradiate the rear side of collector by the albedo, i.e. by the reflected solar and sky radiations. In order not to shade the ground unduly, i.e., to keep the albedo component high, a space W of the order of 3D is preferably allowed between collectors when they are arranged in parallel rows.

What is claimed is:

1. A solar collector including an absorber having at least one channel for conducting a fluid receiving the heat absorbed, a housing enclosing the absorber and having radiation-transparent windows covering and spaced from both of the opposite faces of the absorber, and partition members disposed between the absorber and the housing, said absorber being of smaller width and length than the housing, said partition members thermally insulating the absorber from the housing and bridging the spaces between the housing and the absorber along its length and width to block the circulation of air flowing in the space between one face of the absorber and the housing from flowing to the space between the other face of the absorber and the housing, to thereby reduce convection losses from the absorber.

2. A solar collector according to claim 1, wherein said absorber is a flat plate of smaller width and length than the housing, and the partition members are of low thermal conductivity and bridge the spaces between the housing and the absorber along its length and width.

3. A solar collector according to claim 2, wherein the partition members are attached to the housing and support the absorber within the housing.

4. A solar collector according to claim 3, wherein the housing is made of two half-sections attachable together so that one section covers one face of the absorber and the other section covers the other face of the absorber, the partition members being clamped between the two housing sections when attached together.

5. A solar collector according to claim 4, wherein the two housing sections are of transparent plastic each formed with outer flanges for attaching them together with the partition members inbetween.

6. A solar collector according to claim 2, wherein the housing is a thin transparent plastic envelope enclosing the absorber, the absorber being of sufficiently rigid material to provide substantially the complete rigidity of the overall collector.

7. A solar collector according to claim 1, wherein the absorber includes upper and lower metal plates each formed with at least one groove extending the length thereof, the plates being fixed to each other, a fluid tube being disposed within the groove in said plates to provide said fluid channel, each plate also including at least one further groove extending longitudinally thereof, said further groove being vacant of a fluid tube and serving to rigidize the absorber.

8. A solar collector according to claim 1, further including a support for supporting the absorber and housing over a surface, and an albedo board underlying the absorber and housing to reflect radiations to the underside thereof.

* * * * *